United States Patent
Corey et al.

(10) Patent No.: US 11,566,647 B2
(45) Date of Patent: Jan. 31, 2023

(54) ACOUSTO-OPTIC DEVICE WITH CAPTIVE FASTENER AND RELATED ASSEMBLIES AND METHODS

(71) Applicant: EAGLE TECHNOLOGY, LLC, Melbourne, FL (US)

(72) Inventors: Christopher A. Corey, Palm Bay, FL (US); Carrigan L. Braun, West Melbourne, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 282 days.

(21) Appl. No.: 16/789,571

(22) Filed: Feb. 13, 2020

(65) Prior Publication Data

US 2021/0254645 A1 Aug. 19, 2021

(51) Int. Cl.
*F16B 5/02* (2006.01)
*F16B 41/00* (2006.01)
*F16B 37/14* (2006.01)
*G02F 1/33* (2006.01)

(52) U.S. Cl.
CPC .......... *F16B 5/0258* (2013.01); *F16B 5/0208* (2013.01); *F16B 5/0266* (2013.01); *F16B 37/145* (2013.01); *F16B 41/002* (2013.01); *G02F 1/33* (2013.01)

(58) Field of Classification Search
CPC .... F16B 5/0208; F16B 41/002; F16B 37/145; F16B 43/00
USPC .................................................. 411/353, 544
See application file for complete search history.

(56) References Cited

U.S. PATENT DOCUMENTS

| | | | |
|---|---|---|---|
| 2,831,520 A * | 4/1958 | Clarke | F16B 5/0208 |
| | | | 292/251 |
| 3,180,389 A | 4/1965 | Charles | |
| 3,209,806 A | 10/1965 | Currier et al. | |
| 3,245,450 A * | 4/1966 | Sauter | F16B 21/02 |
| | | | 411/999 |
| 3,346,032 A | 10/1967 | Bulent | |
| 3,415,302 A | 12/1968 | Beck | |
| 3,831,137 A * | 8/1974 | Cuomo | G01V 1/186 |
| | | | 367/141 |
| 4,069,855 A | 1/1978 | Petroshanoff | |
| 4,191,236 A | 3/1980 | Duran | |
| 4,387,497 A * | 6/1983 | Gulistan | B23P 11/00 |
| | | | 29/520 |

(Continued)

*Primary Examiner* — Flemming Saether
(74) *Attorney, Agent, or Firm* — Allen, Dyer, Doppelt + Gilchrist, P.A.

(57) ABSTRACT

An acousto-optic device may include an acousto-optic component carried by a chassis, and a fastener assembly for removably securing a cover to the chassis. The fastener assembly may include a base sleeve having an enlarged head, and a tubular body and extending through a cover passageway. The fastener assembly may include a retainer sleeve having a threaded interior secured to the threaded exterior of the base sleeve to define an anchor member, the anchor member having a threaded interior. The fastener assembly may further include a fastener, a shaft having a threaded exterior opposite the enlarged head and to be threaded through the threaded interior of the anchor member to capture the fastener to the cover and movable through the chassis passageway for removably securing the cover to the chassis.

20 Claims, 8 Drawing Sheets

(56) References Cited

U.S. PATENT DOCUMENTS

| | | | | |
|---|---|---|---|---|
| 4,396,327 A | * | 8/1983 | Menke | F16B 41/002 |
| | | | | 411/533 |
| 4,464,091 A | | 8/1984 | Molina | |
| 4,553,890 A | | 11/1985 | Gulistan | |
| 4,594,040 A | | 6/1986 | Molina | |
| 4,609,314 A | | 9/1986 | Metz | |
| 4,692,075 A | | 9/1987 | Metz | |
| 5,206,869 A | * | 4/1993 | Khalid | G02B 6/32 |
| | | | | 372/24 |
| 5,336,028 A | * | 8/1994 | Yamamoto | F16B 41/002 |
| | | | | 411/339 |
| 5,338,139 A | * | 8/1994 | Swanstrom | F16B 41/002 |
| | | | | 411/910 |
| 8,794,889 B2 | | 8/2014 | Aukzemas et al. | |
| 8,827,614 B2 | | 9/2014 | Tseng | |
| 8,950,991 B2 | | 2/2015 | Trifilio et al. | |
| 9,033,632 B2 | | 5/2015 | Komsitsky et al. | |
| 9,328,753 B2 | * | 5/2016 | Bachman | F16B 5/0208 |
| 2010/0315698 A1 | * | 12/2010 | Dixon | H01S 3/083 |
| | | | | 359/326 |
| 2013/0014376 A1 | | 1/2013 | Komsitsky et al. | |
| 2014/0096363 A1 | | 4/2014 | Khamithar et al. | |

* cited by examiner

ACOUSTO-OPTIC DEVICE WITH CAPTIVE FASTENER AND RELATED ASSEMBLIES AND METHODS

The present disclosure relates to the field of acousto-optic devices, and, more particularly, to acousto-optic device fasteners and related methods.

BACKGROUND

Electronic components are often installed on mobile platforms, such as land vehicles, ships, and aircraft. The electronic components may include communications equipment, for example. In addition to significant forces generated by the movement of these platforms, these electronic components may also be exposed to heavy vibrations. To maintain a clean environment, as well as to provide sufficient structural support, these electronic components and devices are mounted onto racks. Captive fasteners are typically used to couple the electronic components to racks.

To further protect the electronic components, a panel cover is attached over the electronic components. The captive fasteners are typically sequentially installed through openings in the panel cover, aligned openings in the electronic components themselves, and aligned openings in the rack, which couples them together.

Some captive fasteners may be installed by pressing the fastener into a pre-drilled or punched opening in the panel cover. In this case, a squeezing force is applied to embed the fastener in the panel cover. The squeezing process causes displaced panel material to flow into the shank of the fastener (through a cold flow process) locking the fastener to the panel.

SUMMARY

Generally, an acousto-optic device may include a chassis and an associated cover therefor. The chassis may have a chassis passageway therethrough, and the cover may have a cover passageway therethrough and aligned with the chassis passageway. The acousto-optic device may comprise at least one acousto-optic component carried by the chassis, and a fastener assembly for removably securing the cover to the chassis. The fastener assembly may include a base sleeve comprising an enlarged head, and a tubular body coupled thereto and extending through the cover passageway. The tubular body may have a threaded exterior. The fastener assembly may include a retainer sleeve having a threaded interior secured to the threaded exterior of the base sleeve to define an anchor member, the anchor member having a threaded interior. The fastener assembly may further comprise a fastener comprising an enlarged head, and a shaft extending therefrom. The shaft may have a threaded exterior opposite the enlarged head and to be threaded through the threaded interior of the anchor member to capture the fastener to the cover and movable through the chassis passageway for removably securing the cover to the chassis.

In some embodiments, the tubular body of the base sleeve may have a threaded interior defining the thread interior of the anchor member. In other embodiments, the retainer sleeve may include a reduced diameter threaded interior aligned with the threaded interior of the retainer sleeve. The reduced diameter threaded interior may define the threaded interior of the anchor member.

More specifically, the cover passageway may comprise a counterbored cover passageway. The enlarged head of the base sleeve may be spaced apart from adjacent portions of the cover passageway. The retainer sleeve may comprise a reduced diameter passageway to abut the tubular body of the base sleeve.

Also, the fastener assembly may comprise a biasing member coupled between the retainer sleeve and the enlarged head of the fastener, and a washer coupled between the enlarged head of the fastener and the biasing member. The biasing member may comprise a coil spring, for example. The fastener may comprise a nut secured to the threaded exterior of the shaft on a side of the chassis opposite the cover.

Another aspect is directed to a fastener assembly for removably securing a chassis and an associated cover together. The chassis may have a chassis passageway therethrough, and the cover may have a cover passageway therethrough and aligned with the chassis passageway. The fastener assembly may include a base sleeve comprising an enlarged head, and a tubular body coupled thereto and extending through the cover passageway, the tubular body having a threaded exterior. The fastener assembly may include a retainer sleeve having a threaded interior secured to the threaded exterior of the base sleeve to define an anchor member, the anchor member having a threaded interior. The fastener assembly may further comprise a fastener comprising an enlarged head, and a shaft extending therefrom. The shaft may have a threaded exterior opposite the enlarged head and to be threaded through the threaded interior of the anchor member to capture the fastener to the cover and movable through the chassis passageway for removably securing the cover to the chassis.

Yet another aspect is directed to a method for making a fastener assembly for removably securing a chassis and an associated cover together. The chassis may have a chassis passageway therethrough, and the cover may have a cover passageway therethrough and aligned with the chassis passageway. The method may include providing a base sleeve comprising an enlarged head, and a tubular body coupled thereto to extend through the cover passageway, the tubular body having a threaded exterior. The method may include providing a retainer sleeve having a threaded interior to be secured to the threaded exterior of the base sleeve to define an anchor member, the anchor member having a threaded interior. The method further includes providing a fastener comprising an enlarged head, and a shaft extending therefrom. The shaft may have a threaded exterior opposite the enlarged head and to be threaded through the threaded interior of the anchor member to capture the fastener to the cover and movable through the chassis passageway for removably securing the cover to the chassis.

DETAILED DESCRIPTION

Figure 1:
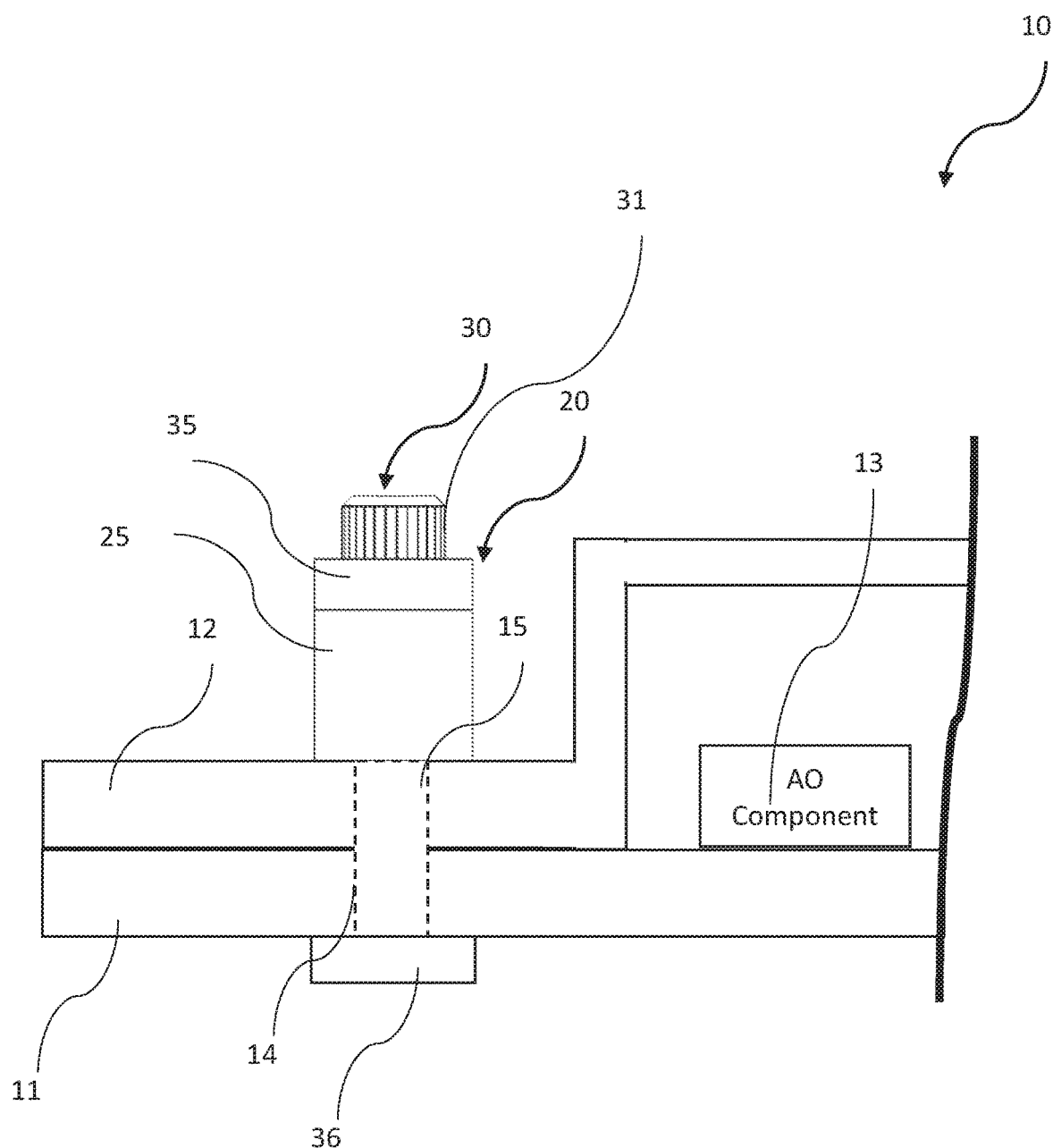
FIG. 1 is a schematic side view of an acousto-optic device, according to the present disclosure.
Figure 2:
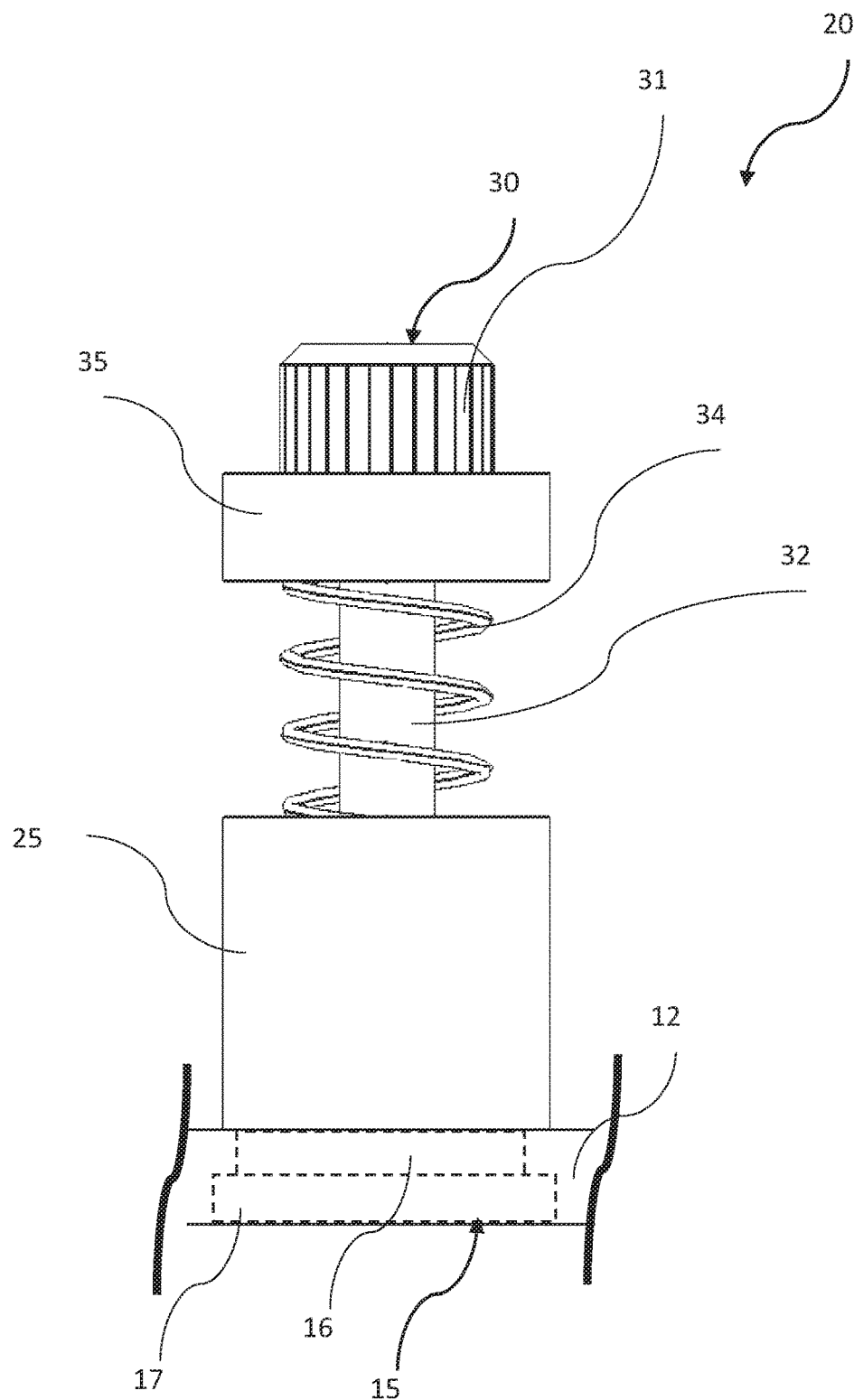
FIG. 2 is a schematic side view of the fastener assembly from the acousto-optic device from FIG. 1 in an uncompressed state without the nut and the chassis.
Figure 3:
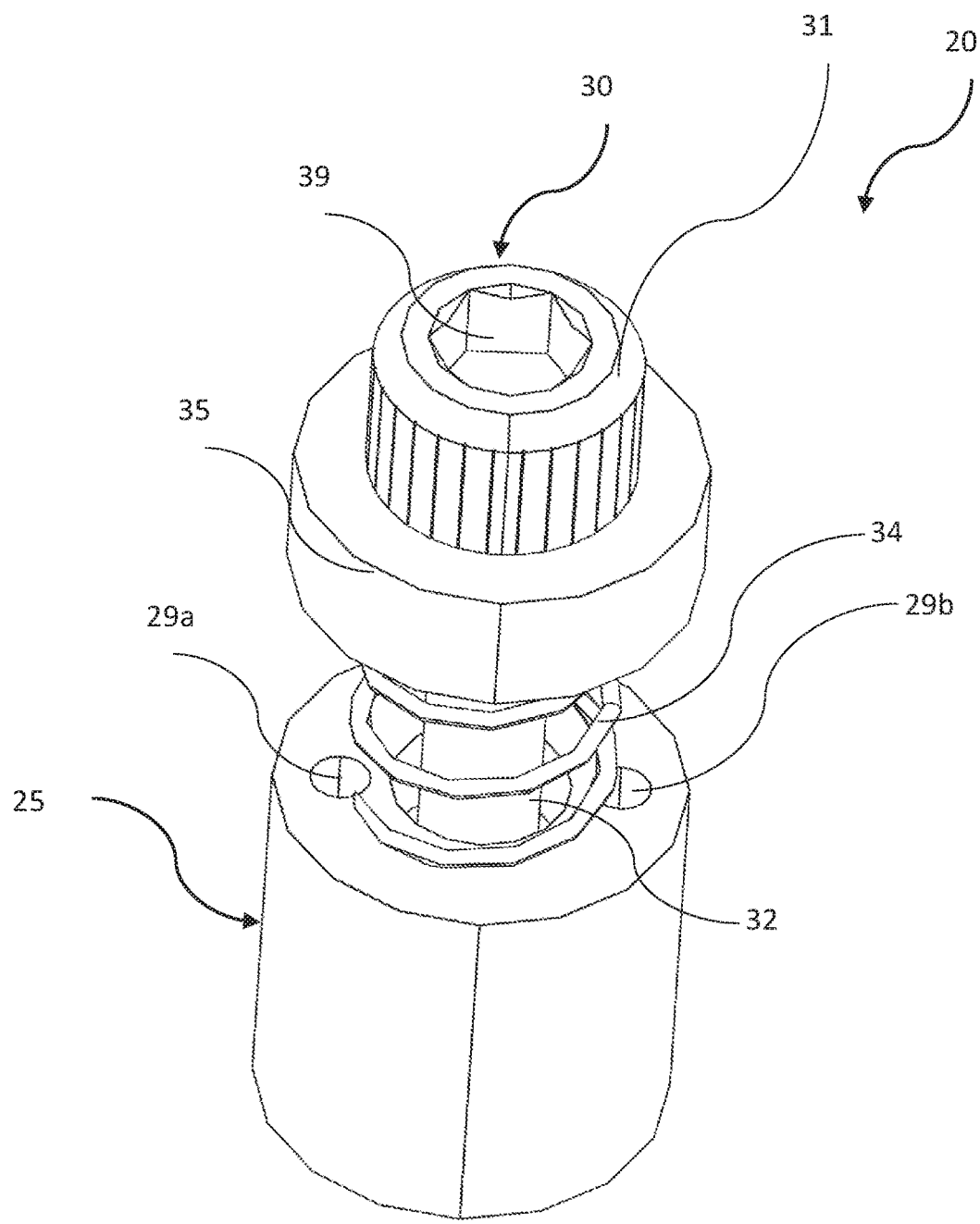
FIG. 3 is a schematic perspective view of the fastener assembly from the acousto-optic device from FIG. 1 in the uncompressed state without the nut, the base sleeve, and the chassis.
Figure 4:
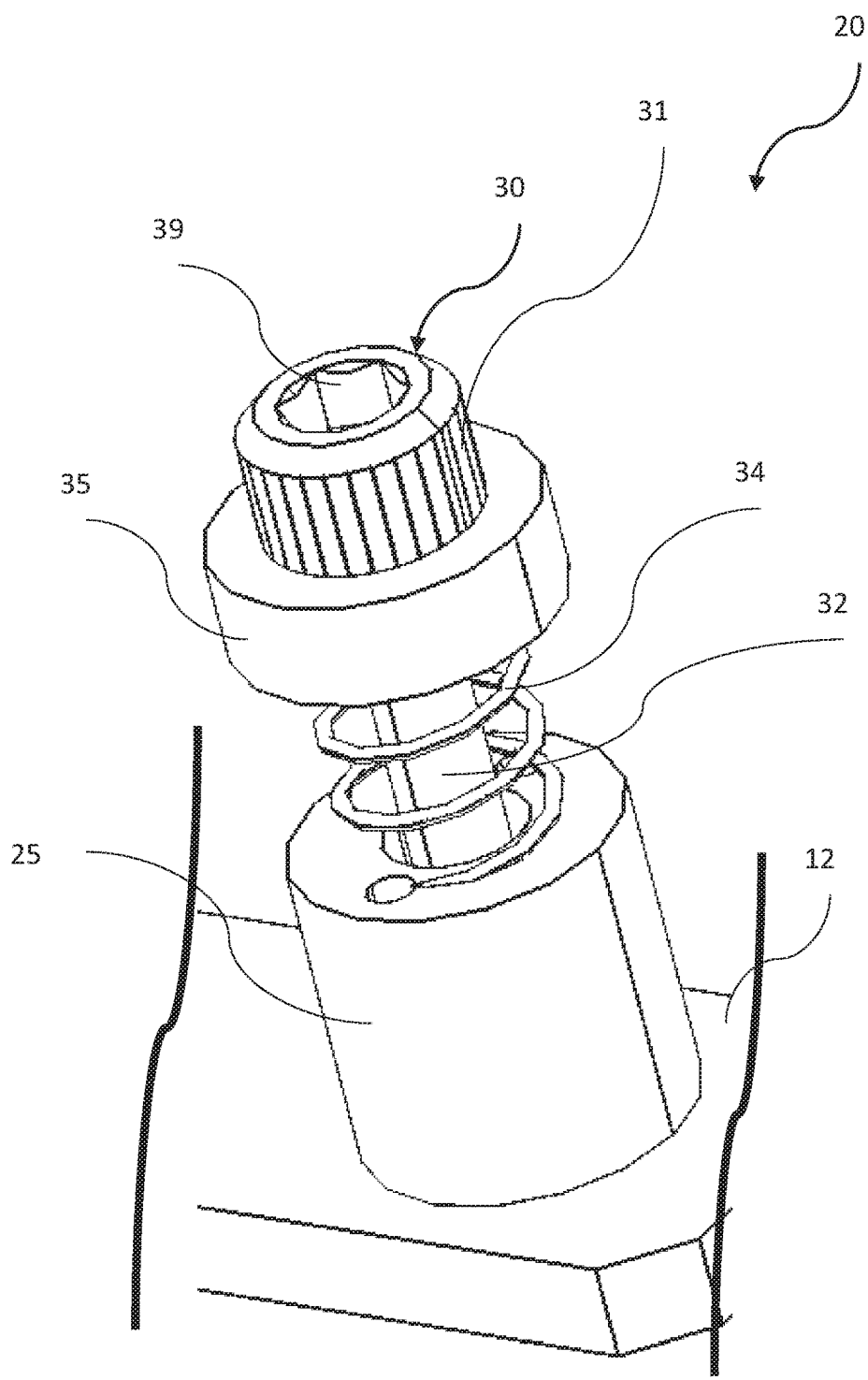
FIG. 4 is a schematic perspective view of the fastener assembly from the acousto-optic device from FIG. 1 in the uncompressed state without the nut and the chassis.
Figure 5:
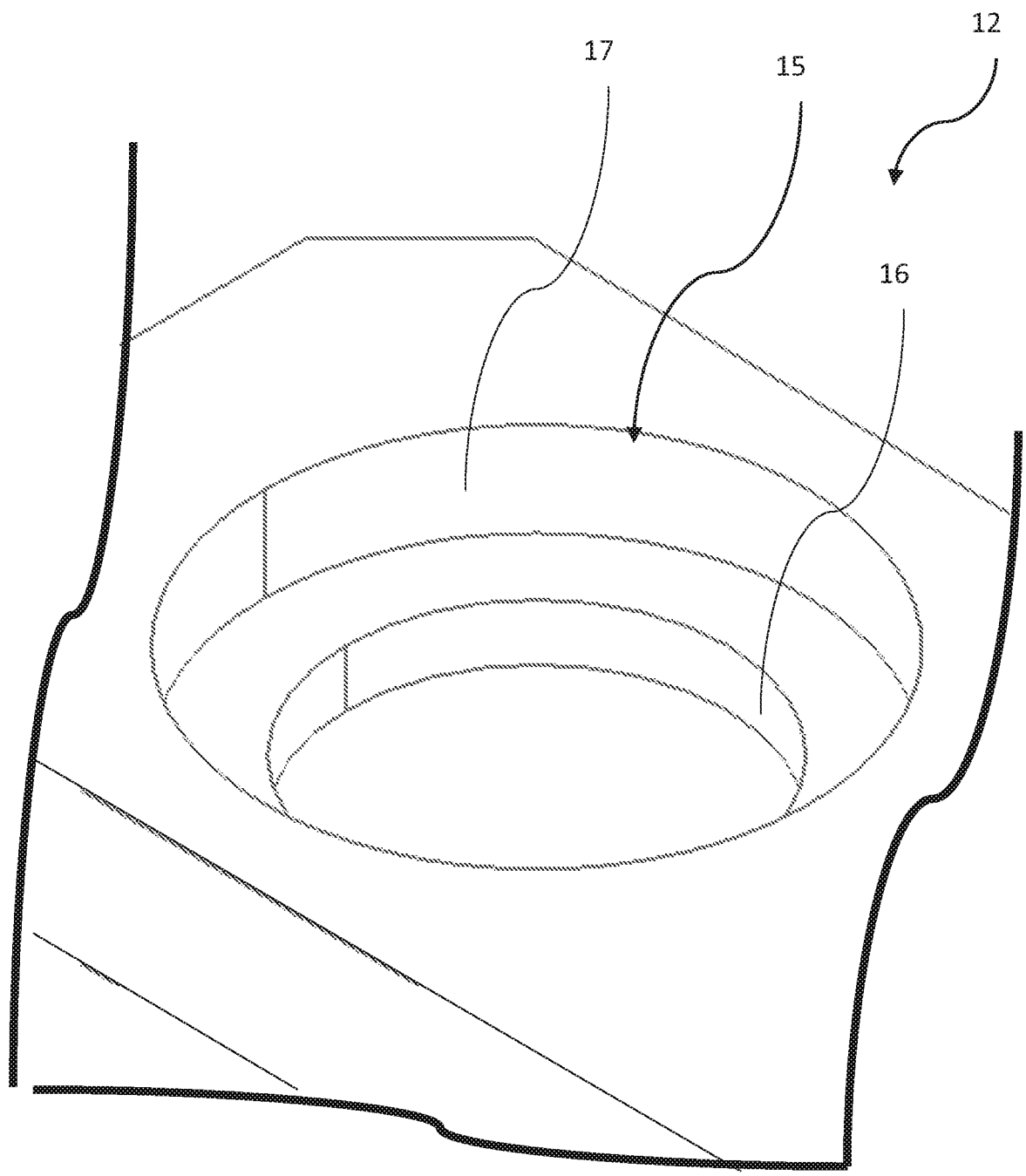
FIG. 5 is a schematic perspective view of the cover and cover passageway from the acousto-optic device from FIG. 1.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

In some applications where electronic components carried by a chassis are protected via a panel cover, captive fasteners are used to provide fast removal and reinstallation of the panel cover. Moreover, captive fasteners prevent dislodgement of the fastener from the panel cover during installation thereof. Typical captive fasteners are coupled to drilled passageways in the periphery of the panel cover via a cold flow or press process that permanently deforms the drilled passageways. To provide a secure coupling, a number of captive fasteners are used, which cumulatively increases the chance of failure.

This may be problematic if a captive fastener needs to be removed, such as for replacement due to damage. In some applications where the drilled passageways in the panel cover are slightly misaligned, the captive fasteners are more readily damaged when threaded into the chassis (e.g. cross-threading). Indeed, when the electrical components are optical in nature, the panel cover needs to be removed periodically to maintenance optical components.

In these scenarios, the drilled passageway cannot support another captive fastener since the adjacent metal portions are damaged. To address this issue, the user may drill out the existing passageway to a greater diameter, and source another different sized captive fastener. In many applications, the chassis cannot support the larger captive fastener and the entire panel cover is replaced (e.g. chassis passageways are fixed in size), which is costly.

Referring now to FIGS. 1-7, an acousto-optic device 10 according to the present disclosure is now described and provides an approach to the noted issues. The acousto-optic device 10 illustratively includes a chassis 11 and an associated cover 12 to be coupled to the chassis. For example, the chassis 11 may be part of a mobile platform, such as an aircraft or a land vehicle. The acousto-optic device 10 comprises an acousto-optic component 13 carried by the chassis 11, and the cover 12 is configured to shield and protect the acousto-optic component. In other applications, the acousto-optic component 13 may alternatively comprise an electronic component. The chassis 11 may comprise a rack system, a platform interior/housing, or any structure strong enough to carry the acousto-optic component 13.

The chassis 11 illustratively comprises a chassis passageway 14 therethrough, and the cover 12 has a cover passageway 15 therethrough and aligned with the chassis passageway. As perhaps best seen in FIGS. 2 & 5-6, the cover passageway 15 comprises a counterbored cover passageway comprising a first borehole 16 facing outward and away from the chassis 11 having a first diameter, and a second borehole 17 facing the chassis and having a second diameter greater than the first diameter.

The acousto-optic device 10 illustratively includes a fastener assembly 20 for removably securing the cover 12 to the chassis 11. As perhaps best seen in FIG. 7, the fastener assembly 20 includes a base sleeve 21 comprising an enlarged head 22, and a tubular body 23 coupled thereto and extending through the cover passageway 15. The tubular body 23 has a threaded exterior 24 and defines an axial through passageway 38.

The fastener assembly 20 illustratively comprises a retainer sleeve 25 having a threaded interior 26 secured to the threaded exterior 24 of the base sleeve 21 to define an anchor member. The enlarged head 22 illustratively comprises a plurality of tool recesses 37a-37b (FIG. 7) for permitting easy threading of the retainer sleeve 25 onto the base sleeve 21. Similarly, the retainer sleeve 25 includes a plurality of tool recesses 29a-29b.

In the illustrated embodiment, the tubular body 23 of the base sleeve 21 has a threaded interior 27 defining a thread interior of the anchor member. As perhaps best seen in FIG. 6, the retainer sleeve 25 comprises a reduced diameter passageway 28 and adjacent shelf to abut the tubular body 23 of the base sleeve 21.

The fastener assembly 20 illustratively includes a fastener 30 comprising an enlarged head 31, and a shaft 32 extending therefrom. The enlarged head 31 of the fastener 30 includes a tool recess 39. The shaft 32 includes a threaded exterior 33 opposite the enlarged head 31 and to be threaded through the threaded interior (i.e. the threaded interior 27 of the base sleeve 21) of the anchor member to capture the fastener 30 to the cover 12 and movable through the chassis passageway 14 for removably securing the cover to the chassis 11.

The fastener assembly 20 illustratively includes a biasing member 34 coupled between the retainer sleeve 25 and the enlarged head 31 of the fastener 30. The biasing member 34 illustratively comprises a coil spring, for example. Also, in the illustrated embodiment, the fastener assembly 20 comprises a washer 35 coupled between the enlarged head 31 of the fastener 30 and the biasing member 34. The recess in the washer 35 is sized such that, when final torque is applied to the fastener 30, the biasing member 34 is not in the primary load-path. In the illustrated embodiment, this means that when the washer 35 "bottoms out" on the retainer sleeve 25, the biasing member is not in its fully compressed state. This is done to a) avoid damage to the biasing member, and b) ensure that full preload can be developed in the bolted joint. Helpfully, as a secondary function, the washer 35 illustratively comprises a shroud which covers the biasing member 34 when the fastener assembly 20 is in the compressed state, which provides a barrier to debris from entering the enclosed space. In some embodiments, the washer 35 and the biasing member 34 may be removed for cost reduction purposes.

Figure 6:
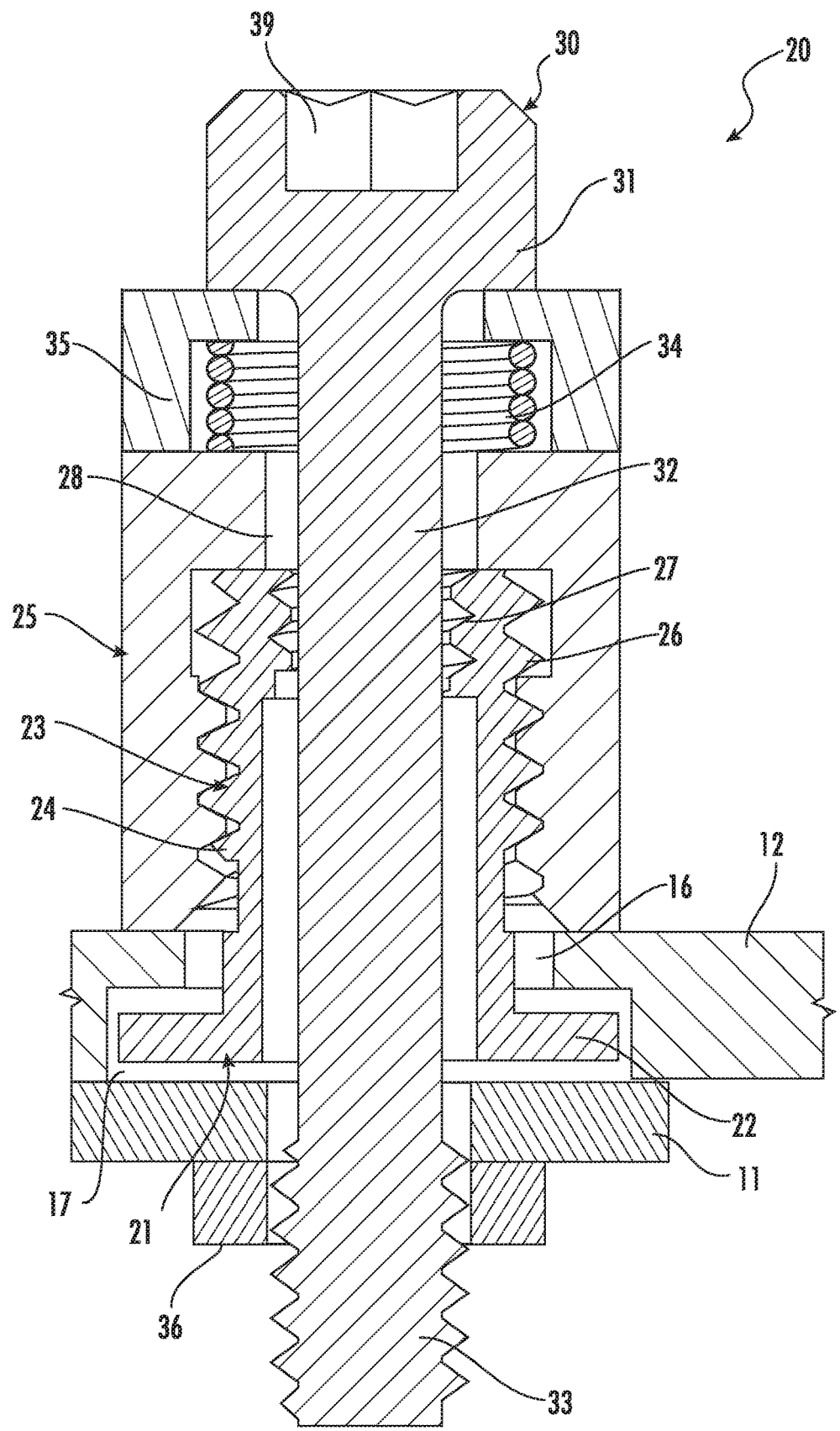
FIG. 6 is a schematic cross-sectional view of the fastener assembly from the acousto-optic device from FIG. 1 in the compressed state.
Figure 7:
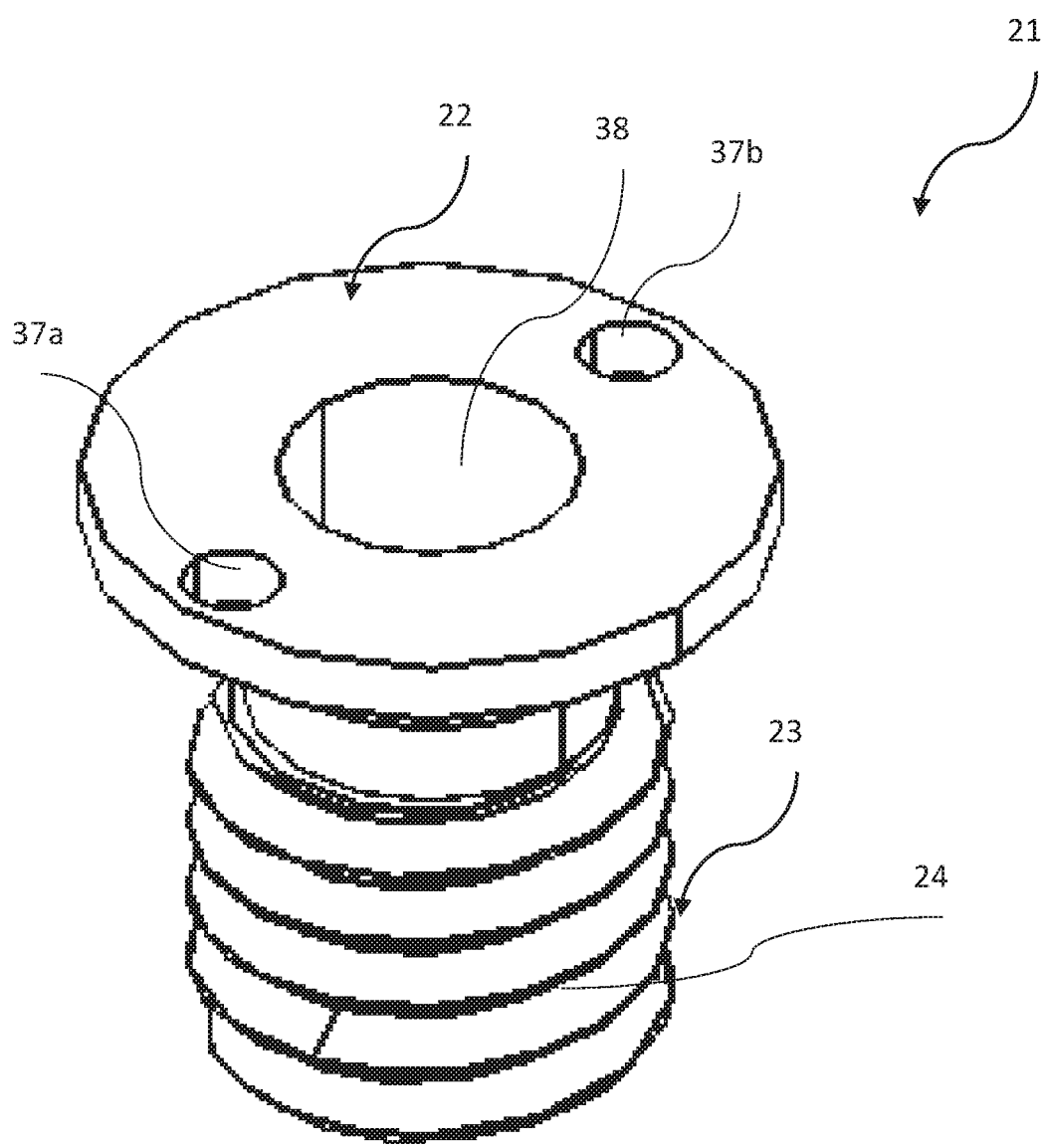
FIG. 7 is a schematic perspective view of the base sleeve from the acousto-optic device from FIG. 1.

As perhaps best seen in FIG. 6, the enlarged head 22 of the base sleeve 21 is spaced apart from adjacent portions of the cover passageway 15. In other words, the fastener assembly 20 is floating within the cover passageway 15.

As perhaps best seen in FIGS. 1 & 6, the fastener 30 comprises a nut 36 secured to the threaded exterior 33 of the shaft 32 on a side of the chassis 11 opposite the cover 12. In other embodiments, the nut 36 may be omitted when the chassis passageway 14 is threaded, or when the fastener 30 has a self-tapping threaded shaft.

In some embodiments, the fastener assembly 20 comprises a metallic material, for example. Of course, in other embodiments, the fastener assembly 20 may comprise a polymer material, or any other material with sufficient mechanical strength. The cover 12 may comprise a metallic material (e.g. sheet metal) or a polymer material, for example.

Yet another aspect is directed to a method for making a fastener assembly 20 for removably securing a chassis 11 and an associated cover 12 together. The chassis 11 has a chassis passageway 14 therethrough, and the cover 12 has a cover passageway 15 therethrough and aligned with the chassis passageway. The method includes providing a base sleeve 21 comprising an enlarged head 22, and a tubular body 23 coupled thereto to extend through the cover passageway 15, the tubular body having a threaded exterior 24. The method includes providing a retainer sleeve 25 having a threaded interior 26 to be secured to the threaded exterior 24 of the base sleeve 21 to define an anchor member, the anchor member having a threaded interior. The method further includes providing a fastener 30 comprising an enlarged head 31, and a shaft 32 extending therefrom. The shaft 32 has a threaded exterior 33 opposite the enlarged head 31 and to be threaded through the threaded interior (i.e. the threaded interior 27 of the base sleeve 21) of the anchor member to capture the fastener 30 to the cover 12 and movable through the chassis passageway 14 for removably securing the cover to the chassis 11. The method comprises providing a biasing member 34 to be coupled between the retainer sleeve 25 and the enlarged head 31 of the fastener 30.

Another aspect is directed to a method for installing the fastener assembly 20 and coupling the cover 12 to the chassis 11. The method includes providing the base sleeve 21 in the cover passageway. The method includes rotationally locking the base sleeve 21 via the plurality of tool recesses 37a-37b, and threading the retainer sleeve 25 onto the base sleeve. The method includes passing the fastener 30 through the washer 35, the biasing member 34, and the reduced diameter passageway 28 of the retainer sleeve 25. The method includes threading the shaft 32 of the fastener 30 through the threaded interior 27 of the base sleeve 21, which prevents the fastener from backing out during placement of the cover 12. The method includes compressing the biasing member 34 from an uncompressed state (FIGS. 2-3 & 4) to a compressed stated (FIGS. 1 & 6) and extending the shaft 32 through the chassis passageway for coupling therein.

Figure 8:
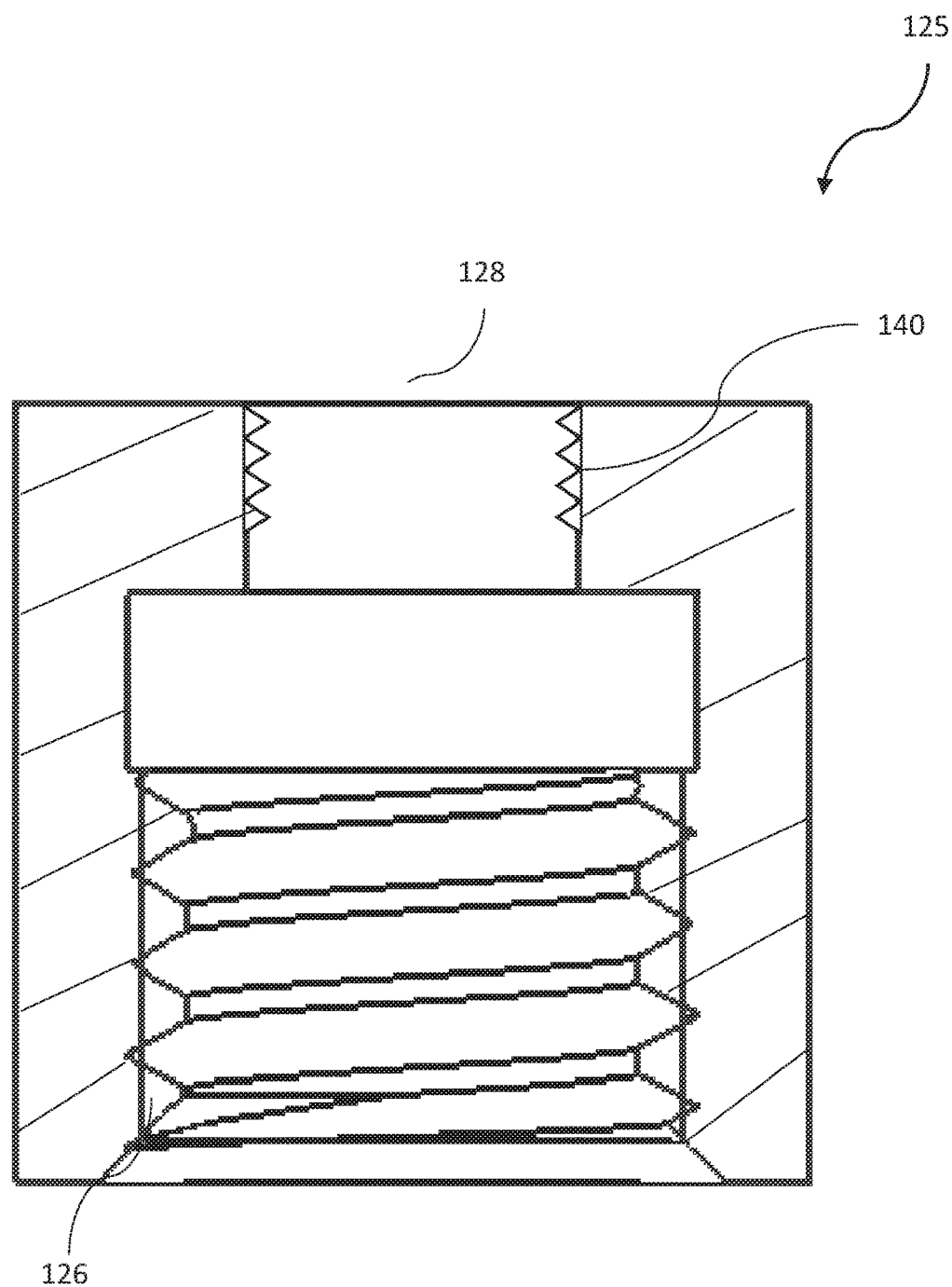
FIG. 8 is a schematic cross-sectional view of another embodiment of the retainer sleeve from the acousto-optic device from FIG. 1.

Referring now additionally to FIG. 8, another embodiment of the retainer sleeve 125 is now described. In this embodiment of the retainer sleeve 125, those elements already discussed above with respect to FIGS. 1-6 are incremented by 100 and most require no further discussion herein. This embodiment differs from the previous embodiment in that this retainer sleeve 125 illustratively includes a reduced diameter threaded interior 140 aligned with the threaded interior 126 of the retainer sleeve. The reduced diameter threaded interior 140 defines the threaded interior of the anchor member (i.e. stopping the fastener from backing out), and the threaded interior of the base sleeve would be omitted.

Advantageously, the fastener assembly 20 is coupled to the cover 12 without permanent damage to the cover passageway 15. This is in contrast to typical captive fasteners, which permanently deform the cover passageway 15. Moreover, with the floating design of the base sleeve 21 in the cover passageway 15, the fastener assembly 20 can tolerate greater variation in the dimensions of the drilled passageways (i.e. looser tolerances on cover passageway placement, making for easier preparation work). The fastener assembly 20 is readily removable and replaceable, and provides an arbitrary radial float (float is driven by the hole size in the parent material and can be tailored for individual applications). The fastener assembly 20 may provide for edge proximity since the parent material isn't stressed during installation, and this system can be installed much closer to edges or bends than typical approaches.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An acousto-optic device comprising:
    a chassis and an associated cover therefor, said chassis having a chassis passageway therethrough and said cover having a cover passageway therethrough and aligned with the chassis passageway;
    at least one acousto-optic component carried by said chassis; and
    a fastener assembly for removably securing said cover to said chassis, said fastener assembly comprising
        a base sleeve comprising an enlarged head, and a tubular body coupled thereto and extending through the cover passageway, the tubular body having a threaded exterior,
        a retainer sleeve having a threaded interior secured to the threaded exterior of said base sleeve to define an anchor member, the anchor member having a threaded interior,
        a fastener comprising an enlarged head, and a shaft extending therefrom, said shaft having a threaded exterior opposite said enlarged head and to be threaded through the threaded interior of the anchor member to capture said fastener to said cover and movable through the chassis passageway for removably securing said cover to said chassis, the fastener when in a secured position causing the enlarged head of the base sleeve to be spaced apart from adjacent portions of the chassis and cover within the cover passageway,
        a biasing member, and
        a washer coupled between said enlarged head of said fastener and said biasing member, said washer contacting an uppermost portion of said retainer sleeve in the secured position, said washer comprising a counterbore for receiving the biasing member.

2. The acousto-optic device of claim 1 wherein said tubular body of said base sleeve has a threaded interior defining the threaded interior of the anchor member.

3. The acousto-optic device of claim 1 wherein said retainer sleeve includes a reduced diameter threaded interior aligned with the threaded interior of said retainer sleeve, said reduced diameter threaded interior defining the threaded interior of the anchor member.

4. The acousto-optic device of claim 1 wherein the cover passageway comprises a counterbored cover passageway.

5. The acousto-optic device of claim 1 wherein said retainer sleeve comprises a reduced diameter passageway to abut said tubular body of said base sleeve.

6. The acousto-optic device of claim 1 wherein said biasing member comprises a coil spring.

7. The acousto-optic device of claim 1 wherein said fastener comprises a nut secured to the threaded exterior of said shaft on a side of said chassis opposite said cover.

8. The acousto-optic device of claim 1 wherein the cover passageway comprises a first borehole facing outward and away from the chassis having a first diameter, and a second borehole facing the chassis and having a second diameter greater than the first diameter.

9. A fastener assembly for removably securing a chassis and an associated cover together, the chassis having a chassis passageway therethrough, and the cover having a cover passageway therethrough and aligned with the chassis passageway, the fastener assembly comprising:
- a base sleeve comprising an enlarged head, and a tubular body coupled thereto and extending through the cover passageway, said tubular body having a threaded exterior;
- a retainer sleeve having a threaded interior secured to the threaded exterior of said base sleeve to define an anchor member, the anchor member having a threaded interior;
- a fastener comprising an enlarged head, and a shaft extending therefrom, said shaft having a threaded exterior opposite said enlarged head and to be threaded through the threaded interior of the anchor member to capture said fastener to the cover and movable through the chassis passageway for removably securing the cover to the chassis, the fastener when in a secured position causing the enlarged head of the base sleeve to be spaced apart from adjacent portions of the chassis and cover within the cover passageway;
- a biasing member; and
- a washer coupled between said enlarged head of said fastener and said biasing member, said washer contacting an uppermost portion of said retainer sleeve in the secured position, said washer comprising a counterbore for receiving the biasing member.

10. The fastener assembly of claim 9 wherein said tubular body of said base sleeve has a threaded interior defining the threaded interior of the anchor member.

11. The fastener assembly of claim 9 wherein said retainer sleeve includes a reduced diameter threaded interior aligned with the threaded interior of said retainer sleeve, said reduced diameter threaded interior defining the threaded interior of the anchor member.

12. The fastener assembly of claim 9 wherein said retainer sleeve comprises a reduced diameter passageway to abut said tubular body of said base sleeve.

13. The fastener assembly of claim 9 wherein the cover passageway comprises a first borehole facing outward and away from the chassis having a first diameter, and a second borehole facing the chassis and having a second diameter greater than the first diameter.

14. The fastener assembly of claim 9 wherein the fastener causes no permanent damage to the cover passageway when placed in the secured position.

15. A method for making a fastener assembly for removably securing a chassis and an associated cover together, the chassis having a chassis passageway therethrough, and the cover having a cover passageway therethrough and aligned with the chassis passageway, the method comprising:
- providing a base sleeve comprising an enlarged head, and a tubular body coupled thereto to extend through the cover passageway, the tubular body having a threaded exterior;
- providing a retainer sleeve having a threaded interior to be secured to the threaded exterior of the base sleeve to define an anchor member, the anchor member having a threaded interior;
- providing a fastener comprising an enlarged head, and a shaft extending therefrom, the shaft having a threaded exterior opposite the enlarged head and to be threaded through the threaded interior of the anchor member to capture the fastener to the cover and movable through the chassis passageway for removably securing the cover to the chassis, the fastener when in a secured position causing the enlarged head of the base sleeve to be spaced apart from adjacent portions of the chassis and cover within the cover passageway; and
- providing a washer coupled between the enlarged head of the fastener and a biasing member, the washer contacting an uppermost portion of the retainer sleeve in the secured position, said washer comprising a counterbore for receiving the biasing member.

16. The method of claim 15 wherein the tubular body of the base sleeve has a threaded interior defining the threaded interior of the anchor member.

17. The method of claim 15 wherein the retainer sleeve includes a reduced diameter threaded interior aligned with the threaded interior of the retainer sleeve, the reduced diameter threaded interior defining the threaded interior of the anchor member.

18. The method of claim 15 wherein the retainer sleeve comprises a reduced diameter passageway to abut the tubular body of the base sleeve.

19. The method of claim 15 wherein the fastener causes no permanent damage to the cover passageway when placed in the secured position.

20. The method of claim 15 wherein the cover passageway comprises a first borehole facing outward and away from the chassis having a first diameter, and a second borehole facing the chassis and having a second diameter greater than the first diameter.

* * * * *